United States Patent [19]

Gartner

[11] Patent Number: 4,614,370
[45] Date of Patent: Sep. 30, 1986

[54] APPARATUS PROVIDING A WELD-FREE JOINT FOR INTERSECTING PIPES OR TUBES WITHIN A CONDUIT SYSTEM

[75] Inventor: Fritz Gartner, Gundelfingen, Fed. Rep. of Germany

[73] Assignee: Josef Gartner & Co., Fed. Rep. of Germany

[21] Appl. No.: 499,222

[22] Filed: May 31, 1983

[30] Foreign Application Priority Data

Jun. 3, 1982 [DE] Fed. Rep. of Germany ....... 3220945

[51] Int. Cl.$^4$ .............................................. F16L 41/00
[52] U.S. Cl. .................................... 285/150; 285/131; 285/158; 285/189; 285/191; 285/353; 285/384
[58] Field of Search .............. 285/150, 158, 189, 191, 285/194, 131, 132, 185, 175, 353, 357, 384, 393

[56] References Cited

U.S. PATENT DOCUMENTS 1,825,034 9/1931 Weatherhead ...................... 285/150
3,425,632 2/1969 Stout .............................. 285/150 X

FOREIGN PATENT DOCUMENTS 529963 12/1972 Switzerland .

Primary Examiner—Richard J. Scanlan, Jr.
Attorney, Agent, or Firm—Jerome P. Bloom

[57] ABSTRACT

Apparatus providing a weld-free joint for intersecting pipes or tubes within a conduit system includes conduit means defining a first flow path extending in one direction and further conduit means defining a second flow path extending in a second direction which intersects said first flow path and has a releasable connection with said first conduit means embodying therein sealing means operative to preserve the integrity of said first flow path. In a preferred embodiment of the invention the releasable connection includes tubular means at least a portion of which intersects and bridges said first flow path and has a cross sectional dimension less than that of the cross sectional dimension of the interior of said conduit means which defines said first flow path.

18 Claims, 7 Drawing Figures

APPARATUS PROVIDING A WELD-FREE JOINT FOR INTERSECTING PIPES OR TUBES WITHIN A CONDUIT SYSTEM

BACKGROUND OF THE INVENTION

This invention relates to means providing a joint for the weld-free connection of intersecting pipes or tubes abutting each other substantially perpendicularly within a conduit system. It also provides such a joint in a manner that it can be simply and effectively sealed.

It is illustrated herein, by way of example, as forming part of a heating and/or air conditioning installation in a building. In a case such as this the conduit system may be arranged on the outer walls of the building, in the region of its facade lining, to provide that portions thereof forming vertical and cross members are heated by solar radiation. This heat can be used to condition the temperature of rooms in the building, wherein the conduit system forms an advance and return system for a fluid transport agent supplying heat to the rooms and an advance and return system for a fluid transport agent carrying the heat away.

The construction of such a conduit system involves problems because the joints therein must fulfill certain conditions from the point of view of fluid mechanics. These problems have been particularly found to exist in the joints provided between intersecting pipes or tubes which in most instances are at right angles to each other.

The present invention not only overcomes these problems but enables the achievement of a simple, economical and effective weld-free joint between intersecting tubes within a conduit system the nature of which facilitates both assembly and maintenance procedures and preserves the efficiency of the system of which it forms a part.

As far as prior art is concerned, German Publication DE-PS No. 28 57 662 has some general pertinence. It discloses a means with which perpendicularly abutting tubes can be joined in a weld-free manner to form a T-joint. Per its disclosure a bush in which an axial central internal thread is formed is screwed into the end of one tube, perpendicular to, crosswise of and abutted to the end of which is a second tube clamped thereto by means of a screw bolt. However, this publication does not deal with or solve the problems encountered in the case of intersecting tubes.

SUMMARY OF THE INVENTION

Embodiments of the present invention provide apparatus including conduit means defining a first flow path extending in one direction and further conduit means defining a second flow path extending in a second direction which intersects said first flow path and has a releasable connection with said first conduit means embodying therein sealing means operative to preserve the integrity of said first flow path. In a preferred embodiment of the invention the releasable connection includes tubular means at least a portion of which intersects and bridges said first flow path and has a cross sectional dimension less than that of the cross sectional dimension of the interior of said conduit means which defines said first flow path.

Another preferred embodiment of the invention comprises a bush including two externally threaded end portions connected together by means of a central tube portion, the central tube portion being arranged to extend through a continuous tube defining one flow path while the two end portions project from the continuous tube on remote side portions thereof to enable the ends of abutting tubes to be screwed thereto. To simplify this assembly it may be provided that one end portion of the bush is formed with a left hand thread and the other end portion formed with a right hand thread. The ends of the bush may be formed to embody therein an internal hexagonal socket to thereby enable the bush to be turned during the screwing of the abutting tubes thereon, by application through one of the abutting tubes of a socket tool of appropriate length. This will facilitate the assembly of the tubes and the production of a joint in accordance with the present invention. Fluid flow may be ensured in the continuous tube in forming of this joint by making the outer diameter of the central tube portion of the bush smaller than the inner diameter of the continuous tube. If a mixing of the fluids moving through the respective intersecting flow paths so provided is desired, the wall of the central tube portion of the bush can be provided with passage bores.

According to a further embodiment of the invention, in an application wherein two tubes in alignment with each other abut against a continuous tube in which a through-bore is formed, a bush is disposed in and to partially project from the end of each of the tubes which abuts the continuous tube and the bushes are connected together. The portions of the bushes projecting from the ends of the abutting tubes are respectively introduced into the interior of the through-bore in the continuous tube, which is represented by diametrically aligned apertures which have been formed in the wall thereof. The two bushes in the abutting tubes are connected together by suitable means which produces an interconnection of the abutting tubes and a clamping thereof to the continuous tube to form a joint therebetween. In a development of this embodiment of the invention, the arrangement may be such that an externally threaded bush having an axial central threaded bore is screwed in the abutting end of one of the abutting tubes; an externally threaded bush which has an axial central unthreaded screw bore is screwed in the abutting end of the other abutting tube and the bushes are connected by means of a screw bolt. Accordingly, in one bush a threaded portion is provided into which the screw bolt can be screwed while the through-bore of the other bush accommodates the projection therethrough of the body of the bolt and provides at the outer end of the means which defines such bore an abutment for the head of the screw bolt. The head of this screw bolt can be formed with a hexagonal socket to facilitate its application by means of a hexagonal socket spanner. This spanner may have a length corresponding to that of the one of the abutting tubes through which it is applied to screw the bush.

In a further development the bushes are interconnected by a coaxial sleeve. The projecting ends of the bushes may be made conical and the sleeve may have its ends pressed into the adjacent ends of the bushes to form a connection therebetween. Such a connection of the two bushes provides means for a separation of the flows which run perpendicular to each other at a point of intersection of the pipes or tubes of the conduit system. If the sleeve is omitted, as will be obvious there can be a mixing of the flows respectively moving through the abutted tubes and the continuous tube to which they abut, at the point of their intersection. The bushes may be suitably apertured to provide passages and communication between the abutted tubes. These apertures may be of various cross section such as semi-annular, by way of example.

According to a further preferred embodiment of the invention applied to a conduit system to form a joint between a continuous tube and two tubes in alignment with each other and abutting the continuous tube, a bush may be provided to have one externally threaded end portion thereof screwed into an end of one abutting tube and applied to project through and crosswise of the continuous tube to dispose its projected extremity within and in a tight fitting relation to an externally threaded auxiliary bush which is screwed into the second abutted tube. The projected extremity of the first mentioned bush projects through and has a portion beyond the auxiliary bush which is externally threaded, to which an annular nut is screwed. The ends of the abutting tubes which engage and are clamped to opposite sides of the continuous tube are provided with annular recesses opening in part from their abutted ends and at their inner surfaces immediately adjacent thereto to accommodate sealing elements which preserve the integrity of the fluid flow path defined in the continuous tube as the abutting tubes are clamped at right angles to the same tube. The construction and arrangement as described is such to prevent damage to the sealing elements applied between the abutting and the continuous tubes. To receive the sealing O-rings the ends of the abutting tubes applied to the continuous tube may in each case be preferably provided with an annular recess into which an O-ring can be inserted, which O-rings are compressed as the intersecting tube structures are assembled to achieve a joint per the present invention.

Where the fluid flows intersecting in a conduit system at a joint in accordance with the invention are similar as to their content, no problems will be involved as long as an absolute seal of the joint is ensured outwardly, a condition found to exist in each embodiment which is herein described.

The invention will be explained in detail, with the aid of the accompanying drawings, wherein.

Figure 1:
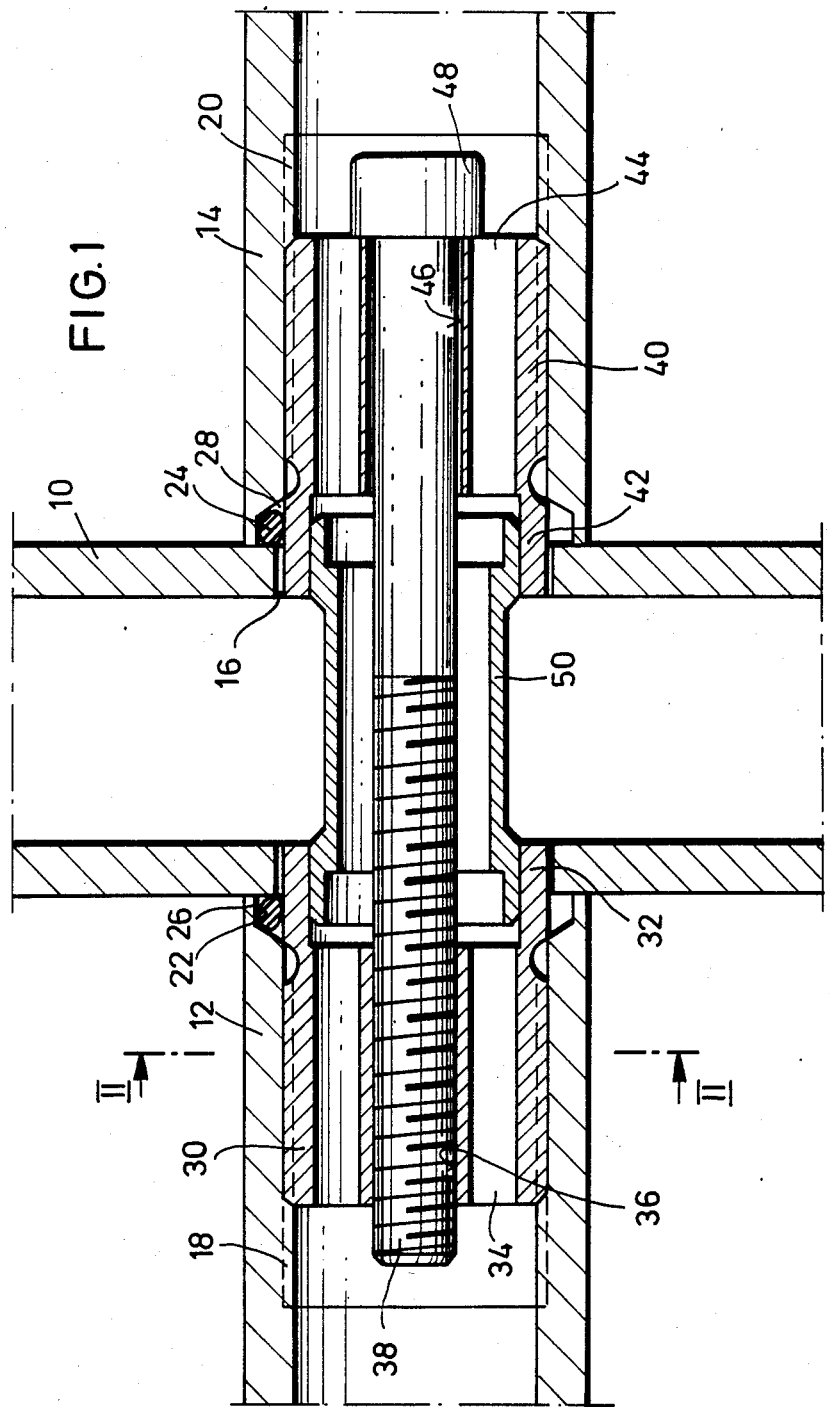
FIG. 1 shows one embodiment of a conduit intersection.

FIG. 1 shows an intersection point in a conduit system wherein there is a continuous tube 10, and perpendicular thereto, two abutting tubes 12 and 14. The tubes 12 and 14 are in a direct axial alignment, with their adjacent ends separated by the tube 10. The continuous tube 10 has a through-bore 16, represented by a pair of diametrically opposite apertures in the wall thereof which in the assembly of the tubes are coaxial with the bores of the tubes 12 and 14. The end portion of the tube 12 which abuts the tube 10 has an internal thread 18 while the end portion of the tube 14 which abuts the tube 10 has an internal thread 20. The ends of the tubes 12 and 14 which directly abut the tube 10 each have an annular recess, respectively 26, 28, at its radially innermost edge portion. Each of these recesses receive and nest therein a sealing O-ring, respectively 22, 24. Screwed into the abutted end of the tube 12 is a bush 30 an externally threaded portion of which is formed to be complementary to the internal thread 18. As so applied, the bush 30 has a small portion 32 thereof projecting outwardly of the end of the tube 12 the length of which corresponds, substantially, to the wall thickness of the tube 10 and is arranged to project into one of the diametrically opposite apertures defined by the through-bore 16.

Figure 2:
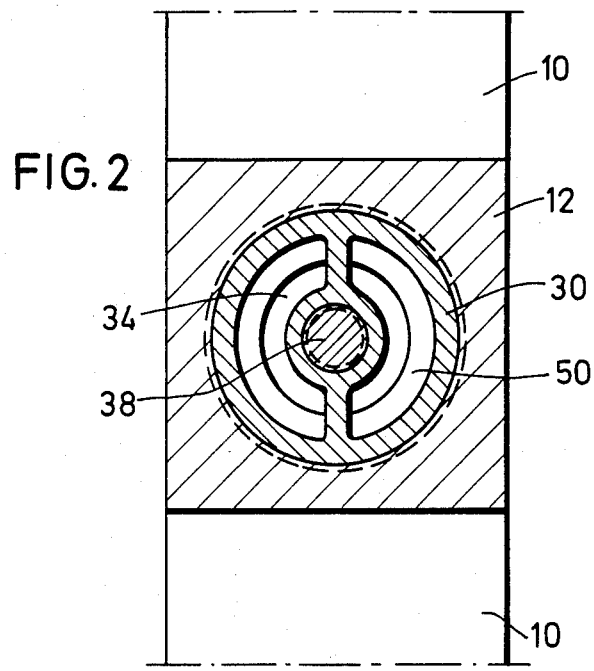
FIG. 2 is a section taken along line II—II of FIG. 1.

As seen from FIG. 2, the interior surface of the bush 30 is diametrically bridged by an integral web structure expanded intermediate its transverse ends to provide therein, the length thereof, an internally threaded bore 36 and to either side of the web a through passage 34 which is substantially semi-circular in cross section. As will be obvious, the passages 34 may be otherwise configured as to their cross section. The bore 36 accommodates the screwing therein of a screw bolt 38 (FIG. 1).

A bush 40 is screwed into engagement with the internal thread 20 in the end of the tube 14 which is arranged to abut the outer side portion of the tube 10 opposite that abutted by the tube 12. The bush 40 has a construction corresponding in all respects to that of the bush 30 except for the fact that its central bore 46 in its web structure, which corresponds as to its position with that of the bore 36 is a substantially smooth through-bore which is not internally threaded. As will be self-evident from FIG. 1, in the assembly of the continuous tube 10 and the abutted tubes 12 and 14 the bores 36 and 46 will be in a longitudinally spaced aligned relation and this arrangement enables the screw bolt 38 to have its leading end inserted in and easily moved through the bore 46, from the end thereof most remote from the bush 30, to extend through the tube 10 by way of the through bore 16 thereof to enter and be screwed into engagement with the thread of the bore 36. In the application of the screw bolt 38 the expanded head thereof will serve as a limit to abut the end of the web structure of the bush 40 as the threaded interconnection of the bolt with the bush 30 is completed. The head 48 of the bolt may be provided with an internal hexagonal socket to facilitate this application.

Thus, for connecting the tubes 12 and 14 to the tube 10, the tubes 12 and 14 are each respectively provided with its bush 30, 40 as described, and a sealing ring 22, 24 is inserted in the annular groove 26, 28 thus formed (FIG. 1) between each bush 30, 40 and the end of the tube in which it is screwed. The bush end portions 32 and 42 are inserted in the respective diametrically opposed apertures defined by the bore 16 and finally, using a suitable long tool, the screw bolt 38 is introduced through the tube 14, passed through the bush 40 and screwed into the bush 30, thereby to draw the adjacent ends of the tubes 12 and 14 into clamping abutment to diametrically opposite outer side portions of the tube 10 to rim the apertures therein defined by the bore 16. The tubes 12 and 14 are thus essentially coaxially aligned and fixed perpendicular to the tube 10 to define a flow path at right angles to and in intersecting relation to the flow path defined by the tube 10.

If there is to be no mixing of the fluid flowing through the tubes 12 and 14 with the fluid flowing through the tube 10, a sleeve 50 (FIG. 1) may be provided between and in bridging relation to the ends 32 and 42 of the bushes 30 and 40. The dimension of the outer diameter of the sleeve 50 which bridges the tube 10 is made less than the inner diameter of the tube 10, so that the fluid moving through the tube 10 can flow round the sleeve. The adjacent end portions of the bushes may be made conical on the inside so that the sleeve 50, during the pulling together of the bushes 30 and 40, is pressed into the bush ends. An absolutely tight seal between the ends of the sleeve 50 and the bushes 30 and 40 is not necessary where the flowing fluids have the same nature and a slight leak is, therefore, in such case, of no significance.

FIG. 2 shows a section giving a view through the bush 30 from which the form of the passage openings through the bush can be seen.

Figure 3:
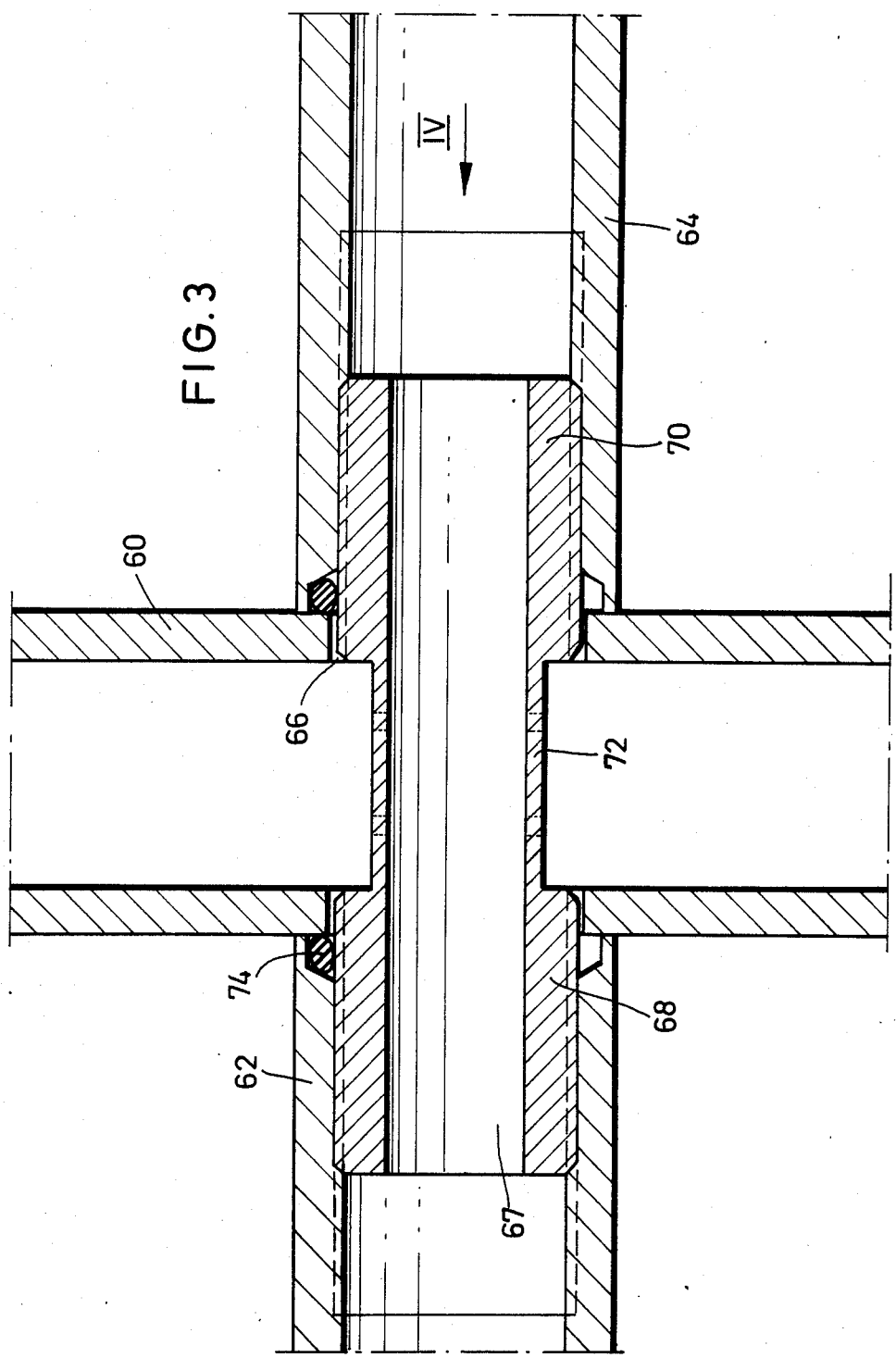
FIG. 3 shows a second embodiment of a conduit intersection.

FIG. 3 shows a joint at an intersection in a conduit system in which a continuous tube 60 is connected to two abutting tubes 62 and 64 in a manner such that tube 60 defines a first flow path and the tubes 62 and 64 define a second flow path which intersects the first at substantially right angles thereto. The tubes 62 and 64 of this embodiment are respectively end abutted to opposite side portions of the tube 60 to dispose their bores in coaxial alignment with each other and with apertures defined by a through-bore 66 in the tube 60. The tubes 62 and 64 are in this case interconnected by means of an integrally formed tubular bush 67. The respective end portions 68 and 70 of the bush 67 are joined by means of a central coaxial tube portion 72 formed integral therewith. The outer diameter of the portion 72 is smaller than the outer diameter of the bush end portions 68 and 70 and smaller than the inner diameter of the tube 60. The ends of the tubes 62 and 64 which respectively abut substantially diametrically opposite outer sides of the tube 60 and rim the apertures defined by the bore 66 are each provided with a recess similar to the recesses 26 and 28 in the tubes 12 and 14 of the embodiment of FIG. 1 and each of these recesses accommodates the insertion therein of a sealing O-ring 74. The bush end portion 68 is provided with an external left thread while its end portion 70 is provided with an external right thread. The adjacent ends of the tubes 62, 64 are formed correspondingly with internal threads which are in mating complementary relation to the external threads on the respective end portions 68 and 70 of the bush 67.

To connect the tubes 62 and 64 to the tube 60, bush 67 is inserted through the tube 60 by way of the bore 66 and positions so its respective end portions 68 and 70 respectively project at opposite sides of the tube 60. Tubes 62 and 64 are then respectively applied against and to a separate one of the end portions 68 and 70 to commence a screwed engagement therewith. A tool passed through one of the tubes 62 and 64 is engaged in an internal hexagonal socket 76 formed at the end of one of the end portions 68 and 70. On turning or rotating the bush 67, the adjacent ends of the tubes 62 and 64 are screwed thereon in an obvious manner, until they are drawn together sufficiently to respectively abut against the remote outer side surface portions of the continuous tube 60, in line with the bore 66. This establishes the tubes 62 and 64 perpendicular to and in a respectively sealed abutment with the tube 60, by virtue of the sealing elements 74. In the process of this connection the O-rings 74, which are originally oversized for the recesses or grooves in which they lodge, are compressed to seal against their seat and to the outer surface of the tube 60 about each of the apertures defined by the through-bore 66. This arrangement provides an insured outer seal preventing the escape of fluid from either the flow path defined in the tube 60 or that defined by the tubes 62 and 64 and their bridging, interconnecting, tubular bush 67. The outer diameter of the central tube portion 72 being less than that of the inner diameter of the tube 60, fluid flowing in the tube 60 can readily pass and flow about the intersecting portion of the bush 67. If one desires a mixing of the fluids conducted through the first and second flow paths defined by the intersecting portions of the conduit system at the joint thereof just described, the portion 72 of the bush 67 can be provided with communicating passages by means of bores therein. Such option which is illustrated by dotted lines superposed on the portion 72 of the bush 67 in FIG. 3 can likewise be incorporated in the portions 50 and 98 of the embodiments shown in FIGS. 1 and 5 of the drawings.

Figure 4:
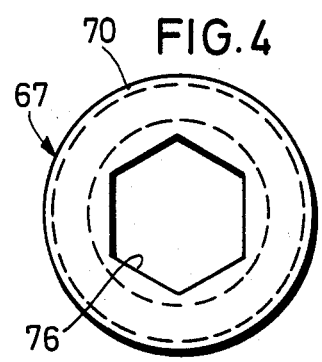
FIG. 4 is a view along the arrow IV of FIG. 3.

FIG. 4 is a view of the end portion 70 of the bush 67 which exhibits at the end thereof an internal socket having a hexagonal configuration 76 facilitating the fit thereto of an appropriate socket spanner, the purpose of which has been previously described.

Figure 5:
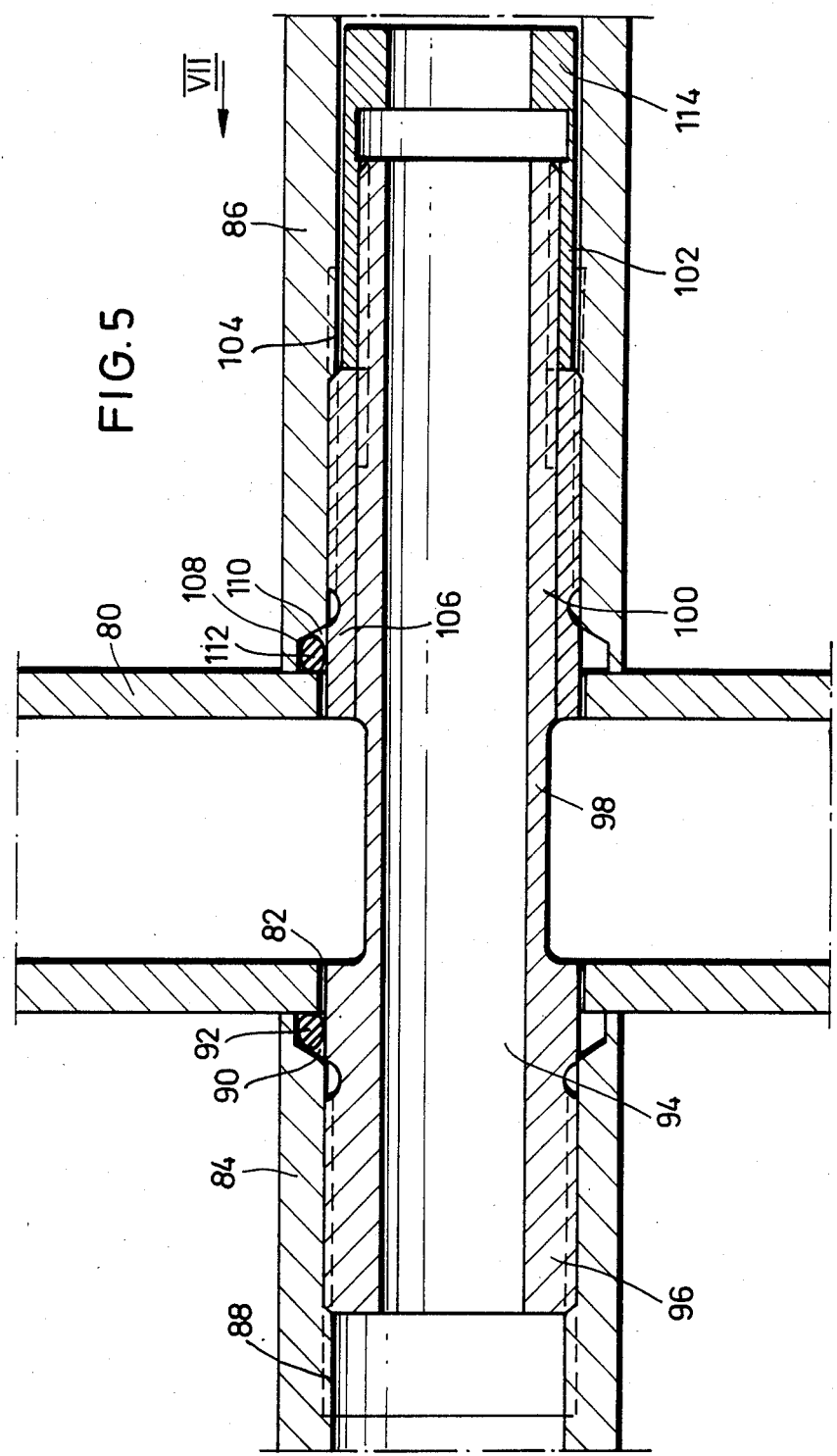
FIG. 5 illustrates a third embodiment of a conduit intersection.

FIG. 5 shows yet another embodiment of a connecting bush 94 useful in forming a joint between a continuous tube defining a flow path in one direction and interconnected tubes defining a second, intersecting, flow path which extends substantially at right angles to and through the first flow path. The joint in this case also embodies O-rings such as the element 74, described with reference to FIG. 3, which are similarly arranged and applied. The construction of this embodiment is made such to give extra insurance against chance damage to the O-rings in the assembly of the joint.

Figure 6:
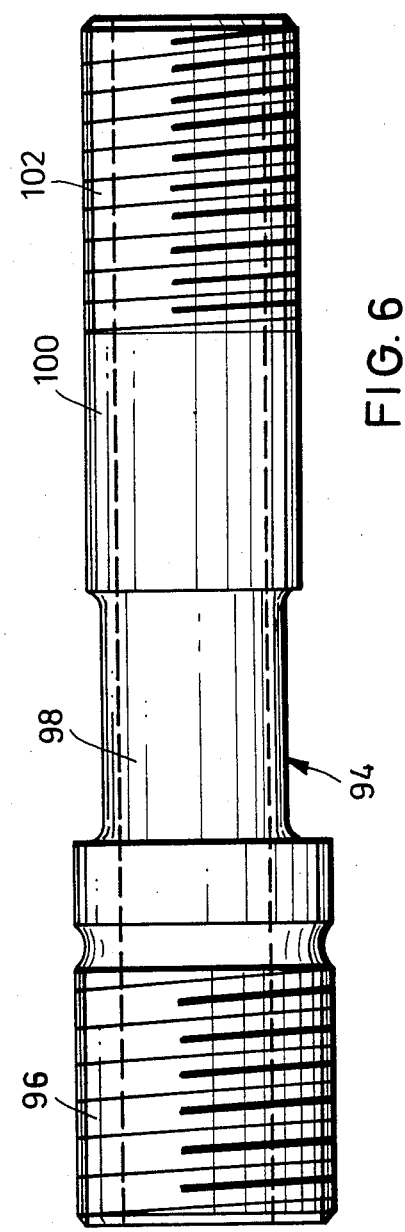
FIG. 6 shows the connecting bush illustrated in FIG. 5.

More particularly, FIG. 5 shows a continuous tube 80 formed with a through-bore 82 producing diametrically opposite apertures in the wall thereof. Tubes 84 and 86 are end abutted to respectively opposite side portions of and thereby spaced by the tube 80. The tubes 84 and 86 are correspondingly substantially coaxially aligned and have their adjacent ends in essentially rimming relation to the apertures defined by the through-bore 82. The abutted end portion of the tube 84 is provided with an internal thread 88 and includes therein a recess 90 at the radially innermost limit of its abutted extremity. The recess 90 is formed similarly to the recess 26 in the abutted end of the tube 12 and accommodates a sealing O-ring 92. Screwed into the tube 84, and radially compressing the O-ring 92, is one end of a long bush 94 the particular detailed form of which can be seen in FIG. 6. For convenience it may be said that the bush 94 consists of four portions, i.e. an end portion 96 for screwing into the tube 84, a central portion 98 which extends through the bore 82 and crosswise of the tube 80, a smooth portion 100 which extends into the abutted end portion of the tube 86 and an externally threaded portion 102 which adjoins the portion 100 and disposes innermost of the tube 86.

The abutting end portion of the tube 86 is formed with an internal thread 104 into which one end portion of an auxiliary bush 106 is screwed. This auxiliary bush, which is tubular and has a smooth inner surface, projects beyond the tube 86 and forms with a recess 108 in the abutted end of this tube, which recess corresponds to the recess 26, an annular groove 110. An O-ring 112 is inserted in the groove 110 to produce a seal between the tube 86 and the tube 80, in an obvious manner.

Figure 7:
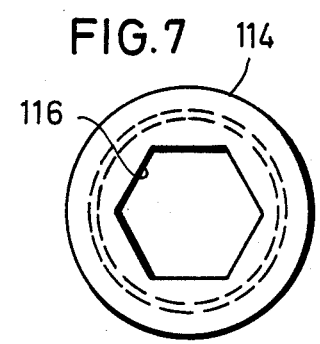
FIG. 7 is a view along the arrow VII of FIG. 5.

Accordingly, for connecting the tubes 84 and 86 to the tube 80, the bush 94 is screwed into the tube 84. Thereafter the bush 94 is passed through the bore 82 and the tube 80. Then the end of the tube 86 to abut the tube 80, provided with the auxiliary bush 106, is applied over the portions 100 and 102 of the bush 94 which project outwardly from the tube 80 at the side portion thereof remote from the tube 84, the O-ring 112 having previously been inserted in the groove 110. At this point an annular nut 114 is inserted in the outermost end of the tube 86 and screwed with a suitably long tool onto the external thread of the portion 102 of the bush 94 to abut the end of the auxiliary bush 106 which positions within the tube 86. This effects the connection of the bush portions to and with the tubes 84 and 86 and the tube 80. As can be seen with particular reference to FIG. 7, the annular nut has an internal configuration corresponding to a hexagon which facilitates the application thereto of the long tool which is used for its insertion and screwing to the portion 102 of the bush 94.

It should be self-evident from the foregoing that in use of the invention one can very simply and effectively construct a conduit system of pipes and tubes including intersections free of welds, within which there are intersecting flow paths including paths which may move crosswise to one another without interference therebetween or intermingling thereof at the cross section. More basically, the invention provides an economical mechanical assembly of joints at intersections which are provided with positive seals and without requirement for welding, thereby rendering installations of the nature described herein more secure and durable and more efficient and satisfactory in use. An element of the benefits of the invention is that the joints may be more readily assembled and disassembled in a relatively short period of time with assurance as to the end product.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for the weld-free connection of pipes or tubes abutting each other substantially perpendicularly within the conduit system of a temperature conditioning installation comprising two tubes each having an end thereof abutting against a third tube, said third tube having a throughbore, means defining a weld-free connection between said two tubes and said third tube including bush means, said bush means being within each of said abutting ends of said two tubes and having a portion thereof in intersecting relation to said third tube, and a sealing ring nested in said tube abutting end of each of said two tubes, at a location inwardly of its radial outermost limit, and bearing against said third tube, thereby to form a seal between said two tubes and said third tube which they abut.

2. Apparatus as in claim 1 characterized in that said bush means comprise two bush portions, one of which has an axial central threaded bore and is screwed to the tube abutting end of the one of said two tubes to which it applies and the other of which is an externally threaded bush having an axial central through-bore and said bush portions are connected by a screw bolt.

3. Apparatus as in claim 1 wherein said intersecting portion of said bush means includes tubular means associated therewith by means of which said third tube is bridged and said two tubes are placed in direct communication and said tubular means is configured to accommodate flow thereby within said third tube.

4. Apparatus as in claim 1 wherein said bush means comprise two bushes each of which applies to one of said two tubes, at the end which abuts said third tube, and said two bushes include adjacent end portions which project from the tubes to which they apply inwardly of said third tube and form extensions of a bridging tube.

5. Apparatus as in claim 1 wherein said bush means comprise two bushes, said bushes being respectively connected in the respective ends of each of said two tubes which abut against said third tube, said bushes being interconnected by a screw bolt which projects through said through-bore of said third tube, to bridge its interior.

6. Apparatus as in claim 5 including a sleeve extending between and forming a linking extension of said two bushes, said sleeve being disposed about and in spaced relation to said screw bolt.

7. Apparatus according to claim 1 characterized in that said bush means have linking means which define at least one passage the respective ends of which communicate the interiors of said two tubes and an intermediate portion of the length of which extends through and bridges said third tube.

8. Apparatus as in claim 1 wherein said bush means comprise tubular structure including externally threaded end portions respectively engaged in and adjustably interconnected with the respective ends of said two tubes which abut said third tube and tubular means bridging said externally threaded end portions and intersecting, projecting through and bridging said third tube by way of its through-bore.

9. Apparatus according to claim 8 characterized in that said externally threaded end portions of said tubular structure are respectively formed with a left hand thread and a right hand thread to provide for their interconnection with and the axial adjustment of said two tubes by rotation of said tubular structure relative thereto.

10. Apparatus according to claim 8 wherein the outer diameter of the portion of said bush means which bridges said third tube is smaller than the inner diameter of said third tube.

11. Apparatus according to claim 9 wherein an internal hexagon is formed in at least one end of said bush means to facilitate an application of a rotating tool thereto through one of said two tubes.

12. Apparatus as in claim 8 wherein said bush means, within the portion thereof which bridges the interior of said third tube, is bored to communicate the interior thereof with the interior of said third tube.

13. Apparatus as in claim 2 wherein each of said bush portions is a tubular element the interior of which has a transversely bridging, longitudinally directed, web, said axial central threaded bore is formed in the web of one of said bush portions and said axial central throughbore, which is unthreaded, is formed in the web of the other said bush portions.

14. Apparatus according to claim 2 wherein said screw bolt is a socket bolt.

15. Apparatus for the weld-free connection of pipes or tubes abutting each other substantially perpendicularly within the conduit system of a temperature conditioning installation comprising two tubes each having an end thereof abutting against a third tube, said third tube having a throughbore, means defining a weld-free connection between said two tubes and said third tube including bush means a portion of which is applied to each of said abutting ends of said two tubes and intersects said third tube, said bush means comprising a tubular structure including externally threaded end portions respectively engaged with the respective ends of said two tubes which abut said third tube, said bush means projecting through and bridging said third tube by way of said through-bore thereof and a sealing ring nested in and projected from the tube abutting ends of said two tubes and forming a seal between said two tubes and said third tube which they abut by virtue of the interconnection of said bush means with said two tubes in the application thereof.

16. Apparatus for the weld-free connection of pipes or tube abutting each other substantially perpendicularly within the conduit system of a temperature conditioning installation comprising two tubes each having an end thereof abutting against a third tube, said third tube having a throughbore, means defining a weld-free connection between said two tubes and said third tube including bush means a portion of which is applied to each of said abutting ends of said two tubes and intersects said third tube, said bush means comprising a bush one end of which has an external thread by means of which it is screwed into the end of one of said two tubes which abuts said third tube, an auxiliary bush having an externally threaded portion which is screwed into the other of said two tubes at the end thereof which abuts said third tube, said bush being a tubular element which is extended from its externally threaded portion to be directed through the interior of said third tube and to bridge the same by way of its through-bore and be extended beyond the interior of said third tube through and beyond and in tight fitting relation to said auxiliary bush and a portion of said bush which projects beyond said auxiliary bush is externally threaded and threadedly engaged by an annular nut by virtue of which said two tubes may be fixed in their abutting relation to said third tube.

17. Apparatus as in claim 16 wherein said bush is a tubular element communicating interiors of said two tubes and intersecting said third tube and in the portion thereof which bridges the interior of said third tube has an outer diameter smaller than the inner diameter of the third tube and sealing rings are applied at the ends of said two tubes which abut said third tube to provide a mechanically sealed joint at the intersection of said tubes.

18. Apparatus as in claim 17 characterized in that the portion of said bush which bridges the interior of said third tube is formed with bores to communicate the flow paths defined by said third tube on the one hand and said two tubes and their interconnecting bush means on the other hand.

* * * * *